April 22, 1958  A. KURTI  2,831,712
FLUID SEALING APPARATUS
Filed Sept. 27, 1955
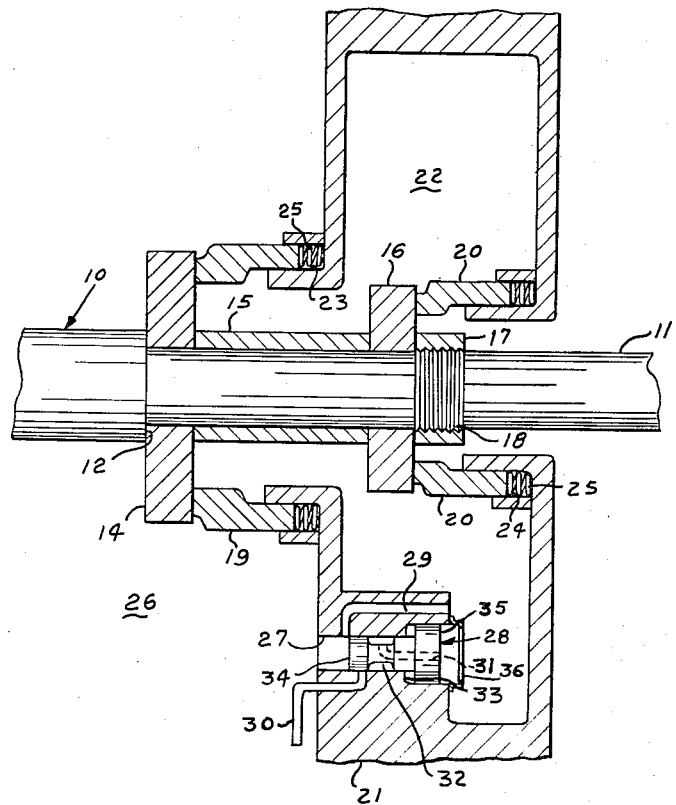
INVENTOR.
ALEXANDER KURTI
BY
ATTORNEYS

United States Patent Office 2,831,712
Patented Apr. 22, 1958

2,831,712

FLUID SEALING APPARATUS

Alexander Kurti, North Woodbury, Conn., assignor to the United States of America as represented by the Secretary of the Air Force Application September 27, 1955, Serial No. 537,078

4 Claims. (Cl. 286—8)

This invention relates to fluid seals and, more particularly, to fluid sealing apparatus for shafts.

It is sometimes desired to maintain a high pressure differential between a chamber surrounding a shaft and the atmosphere. However, a single fluid seal has not been satisfactory to maintain a relatively high pressure differential due to certain inherent limitations. This, of course, has limited the use of this type of fluid seal. The present invention provides an apparatus that permits the use of the same type of seals but with a much larger pressure differential.

The primary object of this invention is to provide a fluid sealing apparatus for a shaft that maintains an effective seal against a high pressure differential.

Other objects of this invention will be readily perceived from the following description of the invention.

This invention relates to a fluid sealing apparatus having a shaft including first sealing means and second sealing means spaced from the first sealing means to form a chamber therebetween. Suitable means are provided to maintain the chamber at a predetermined pressure differential with respect to the pressure on the other side of the first sealing means.

The single figure in the attached drawing is a sectional view of the sealing apparatus of the present invention in its preferred embodiment.

Referring to the drawing, there is shown a shaft 10 including a portion 11 of reduced diameter with a shoulder 12 formed between the reduced portion 11 and the remainder of the shaft 10. A member 14 is slidable on the reduced portion 11 of the shaft and engages the face of the shoulder 12. The member 14 is held against the face of the shoulder 12 by a sleeve 15 surrounding the shaft, a member 16 and a nut 17, which is screwed onto the threads 18 of the reduced portion 11 of the shaft. The members 14 and 16 serve as parts of two separate face seals. A carbon ring or disc 19 cooperates with the member 14 to form one of the face seals and a similar carbon ring or disc 20 cooperates with the member 16 to form a second face seal. A stationary housing 21 cooperates with these two face seals to provide a chamber 22 therebetween. The rings 19 and 20 are prevented from rotating by projections (not shown) on each that cooperate with respective projections (not shown) on the stationary housing 21.

The housing 21 has a pair of annular cavities or recesses 23 and 24 with a plurality of springs 25 disposed in each. The springs 25 in the recesses 23 bear against one end of the carbon ring 19 to urge the other end of the carbon ring against the member 14 to provide a seal between a high pressure chamber 26 and the chamber 22. It should be understood that the chamber 26 surrounds the major portion of the shaft 10 and is the chamber that it is desired to maintain under a high pressure with respect to the atmosphere. The springs 25 in the recess 24 act against the end of the carbon ring 20 which is disposed within the recess 24 to urge the other end of the ring against the member 16 to provide a seal between the chamber 22 and the atmosphere. It will be understood that the springs 25 are employed in order to maintain positive pressure between carbon ring 19 and member 14 and also between ring 20 and member 16 to take care of shaft location due to manufacturing tolerances and thermal expansion and also to compensate for any wear on the carbon ring due to the rubbing speed between the ring and its cooperating member. It will be understood that leakage between the rings 19 and 20 and the housing 21 is prevented by suitable packing means (not shown), which are well known in the art.

In order to maintain the chamber 22 at a desired pressure differential with respect to the high pressure chamber 26, a valve structure is provided within the housing 21. This valve structure includes a valve chamber 27, which provides communication between the chamber 22 and the chamber 26. Direct communication between the chambers 22 and 26 through the valve chamber 27 is prevented by a valve element 28, which is slidable in the valve chamber. A vent conduit or passage 29 connects the valve chamber 27 with the chamber 22 so that the pressure in the chamber 26 is vented to the chamber 22 when the valve element 28 is in the position shown in the drawing. A second vent conduit or passage 30 leads from the valve chamber 27 to the atmosphere. The valve element 28 has a conduit or passage 31 extending from one end thereof to an annular passage 32 so that the pressure in the chamber 22 is vented to the atmosphere through the passages 31, 32 and 30 in that order when the valve element 28 abuts against the shoulder 33 of the valve chamber. The shoulder 33 limits movement of the valve element 28 to the left beyond an operating position while an open end cap 36, which is secured to the housing 21 by suitable means such as welding, limits movement to the right beyond an operating position.

The valve element 28 has an end 34 exposed to the pressure in the high pressure chamber 26 while its other end 35 of the valve element 28 is exposed to the pressure in the chamber 22. The ratio of the area of the end 35 to the end 34 depends on the desired pressure differential between the chambers 22 and 26. In the preferred embodiment, the area of the end 35 of the element 28 is made substantially twice the area of the end 34 of the element 28. Thus, when the pressure in the high pressure chamber 26 exceeds twice the pressure in the chamber 22 the pressure differential causes the valve element to move to the position shown in the drawing whereby the pressure is vented from the high pressure chamber 26 to the chamber 22. However, when the pressure in the chamber 22 is greater than half the pressure in the chamber 26, the element 28 moves to the left from the position shown in the drawing to vent the pressure in the chamber 22 to the atmosphere. It will be understood that any desired intermediate pressure of the chamber 22 with respect to the high pressure chamber 26 may be achieved by varying the ratio of the area of the end 35 of the element 28 to the area of the end 34.

Considering the sealing apparatus, it will be seen that two separate fluid face seals are provided along the reduced portion 11 of the shaft 10. However, by maintaining the chamber 22 at an intermediate pressure, it is readily seen that neither of the face seals is required to provide a seal for a large pressure differential. In the preferred embodiment, each of the face seals maintains approximately half of the pressure differential. As previously explained, the pressure in the chamber 26 is vented to the chamber 22 when the pressure in the high pressure chamber 26 becomes greater than twice the pressure in the chamber 22. Similarly, as the pressure in the chamber 22 becomes greater than half the pressure in the chamber 26, the pressure in the chamber 22 is vented to the atmosphere. Thus, the chamber 22 and the valve structure combine to insure that neither of the face seals is required to operate against greater than substantially half the pressure in the high pressure chamber 26.

The particular advantage of this invention is that it increases the pressure range for which standard fluid seals may operate effectively.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A sealing apparatus for effecting a fluid seal along the shaft between a high pressure chamber and the atmosphere including a first sealing means surrounding the shaft, a second sealing means surrounding the shaft and spaced from the first sealing means, a housing cooperating with the first and second sealing means to form a chamber therebetween, an elongated valve chamber connecting the high pressure chamber and said last-mentioned chamber, means connecting the valve chamber with the last mentioned chamber, means longitudinally spaced from said first mentioned means connecting the valve chamber with the atmosphere, a fluid pressure responsive valve element slidable in said valve chamber, one end of said valve element being subject to the pressure in the high pressure chamber and the other end of said valve element being subject to the pressure in the last-mentioned chamber, and the area of said other end of said valve element being greater than the area of said one end of said valve element by a predetermined ratio whereby the valve element is movable between a first position and a second position, said valve element in said first position establishing communication between said high pressure chamber and said last-mentioned chamber through said means connecting the valve chamber with the last mentioned chamber to reduce the pressure in said high pressure chamber but closing communication between said last mentioned chamber and the atmosphere, said valve element in said second position establishing communication between said last-mentioned chamber and the atmosphere through said means connecting the valve chamber with the atmosphere but closing communication between the high pressure chamber and said last mentioned chamber to reduce the pressure in said last-mentioned chamber.

2. A sealing apparatus according to claim 1 in which the predetermined ratio of the area of the other end of the valve element to the area of the one end of the valve element is substantially 2:1.

3. A sealing apparatus for effecting a fluid seal along the shaft between a high pressure chamber and the atmosphere including a first sealing means surrounding the shaft, a second sealing means surrounding the shaft and spaced from the first sealing means, a housing cooperating with the first and second sealing means to form a chamber therebetween, an elongated valve chamber connecting the high pressure chamber and said last-mentioned chamber, a first conduit providing communication between the valve chamber and the last-mentioned chamber, a second conduit providing communication between the valve chamber and the atmosphere, the opening of said second conduit in said elongated valve chamber being longitudinally spaced from the opening of said first conduit, a fluid pressure responsive valve element slidably operable in said valve chamber to control the flow of fluid through said first and second conduits, said valve element closing said first conduit and opening said second conduit when the ratio of the pressure in said last-mentioned chamber to the pressure in said high pressure chamber is greater than a predetermined ratio, said valve element opening said first conduit and closing said second conduit when the pressure in said high pressure chamber is greater than the pressure in the last-mentioned chamber by a predetermined amount.

4. A sealing apparatus for effecting a fluid seal along the shaft between a high pressure chamber and the atmosphere including a first sealing means surrounding the shaft, a second sealing means surrounding the shaft and spaced from the first sealing means, a housing cooperating with the first and second sealing means to form a chamber therebetween, an elongated valve chamber connecting the high pressure chamber and said last-mentioned chamber, a first conduit providing communication between the valve chamber and the last-mentioned chamber, a second conduit providing communication between the valve chamber and the atmosphere, the opening of said second conduit in said elongated valve chamber being longitudinally spaced from the opening of said first conduit, a fluid pressure responsive valve element slidably operable in said valve chamber to control the flow of fluid through said first and second conduits, said valve element having one end subject to the pressure in the high pressure chamber and the other end subject to the pressure in the last-mentioned chamber, said other end having an area substantially twice the area of said one end, said valve element closing said first conduit and opening said second conduit when the pressure in said last-mentioned chamber is greater than one-half of the pressure in said high pressure chamber, said valve element opening said first conduit and closing said second conduit when the pressure in said high pressure chamber is greater than twice the pressure in the last-mentioned chamber.

References Cited in the file of this patent

UNITED STATES PATENTS

| | | |
|---|---|---|
| 2,153,774 | Poitras et al. | Apr. 11, 1939 |
| 2,175,868 | Bentley | Oct. 10, 1939 |
| 2,479,236 | Hanson | Aug. 16, 1949 |
| 2,593,939 | Trist | Apr. 22, 1952 |
| 2,612,390 | Lewis | Sept. 30, 1952 |
| 2,714,024 | Greene | July 26, 1955 |